United States Patent Office

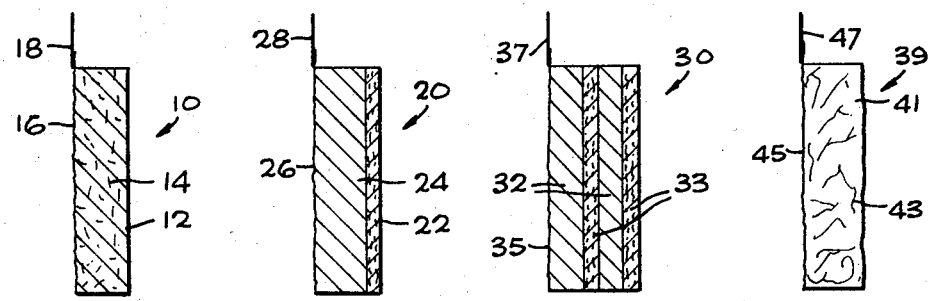
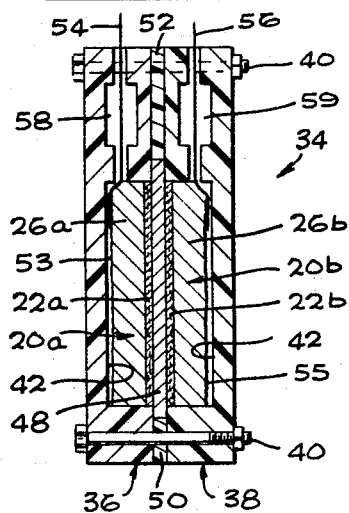
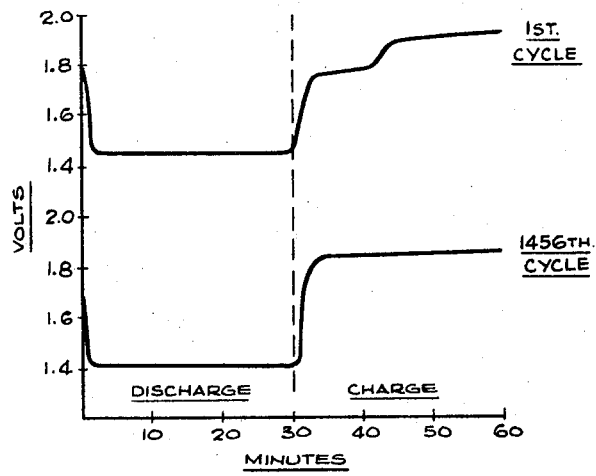
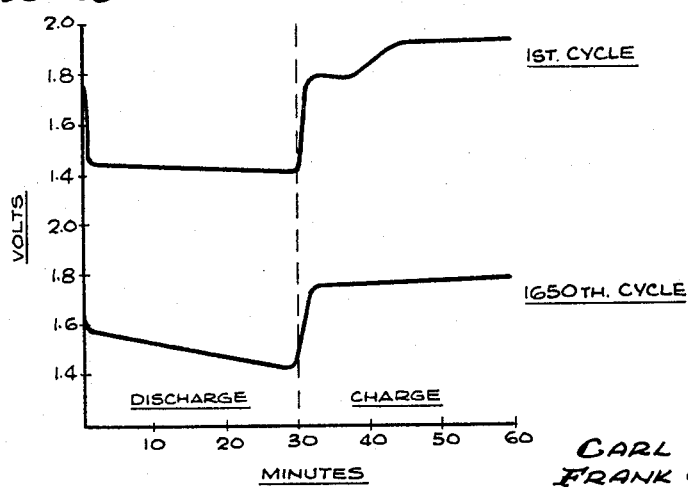

3,397,088
Patented Aug. 13, 1968

3,397,088
BATTERY INCLUDING INORGANIC FIBROUS MATERIAL
Carl Berger, Corona del Mar, and Frank C. Arrance, Costa Mesa, Calif., assignors, by mesne assignments, to McDonnell Douglas Corporation, Santa Monica, Calif., a corporation of Maryland
Filed June 29, 1964, Ser. No. 378,859
9 Claims. (Cl. 136—6)

This invention relates to batteries, particularly high energy density batteries, and is especially concerned with the provision of improved electrode structures for use in batteries, and to improved battery construction embodying electrodes including means to aid in supporting such electrodes.

Batteries are an important source of energy storage for power generation in airborne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead storage batteries. Thus, high energy density batteries can develop, e.g., 100 to 140 watt-hours of energy per pound. In addition to important airborne applications, such high energy density batteries have many other applications such as in portable tools and appliances, television, radio and record players, engine starting, portable X-ray units and the like.

In high energy density batteries such as silver-zinc, nickel-cadmium, silver-cadmium, the electrodes are placed adjacent opposite sides of a membrane or separator which performs the function of retaining electrolyte, e.g., potassium hydroxide, separating the electrodes, and preventing migration of electrode ions which short circuit the battery. In the copending applications Ser. No. 379,093, of Carl Berger et al., filed June 30, 1964, and Ser. No. 378,858, now abandoned, of Carl Berger et al., filed of even date herewith, are described improved inorganic separators for this purpose, and which are particularly suited for battery operation at temperatures above 100° C. It is also known to employ organic separators in such batteries but these are generally inferior to the inorganic separators of the above copending applications. The electrodes are also generally in contact with an electrode screen, e.g., a nickel screen, to which the terminal wires are connected.

However, the physical integrity of zinc and other electrodes used in such batteries is difficult to maintain at room temperature and is particularly difficult to maintain at temperatures of the order of 100° C. and above. Thus, for example, even when the zinc electrode is placed directly in contact with the separator, slumping and segregation of the electrode material towards the bottom of the electrode compartment occurs, making it difficult to maintain good uniform contact between the electrode and the separator and also between the electrode and the electrode screen, and causing changes in electrode characteristics.

One object of the invention accordingly is to provide improved electrode structures, particularly for use in high energy density batteries.

Another object is to provide a novel electrode structure including means for supporting the electrode to prevent slumping, collapse or deterioration of the electrode during use in a battery.

It is another object of this invention to provide improved high energy density batteries having extended periods of life and which are capable of operation at high temperatures of the order of about 100° C. and above, and embodying electrode systems which are supported.

Another object of the invention is the development of a novel supported electrode structure, particularly for silver-zinc, silver-cadmium, nickel-cadmium, and other high energy density battery systems.

A further object of the invention is the design of a battery having a novel improved electrode structure, and which is particularly suited for airborne applications, of small weight capable of being charged and discharged over a large number of cycles, and operating particularly at elevated temperatures, said batteries being capable of withstanding temperatures of the order of 100° C. and higher and which can take advantage of increased electrochemical activity and decreased electrolyte resistance at such elevated temperatures.

A still further object is the provision of improved supported zinc and silver electrodes, particularly designed for use in high energy density silver-zinc cells, incorporating organic or preferably inorganic separators.

Other objects and advantages will appear hereinafter.

In order to minimize or substantially eliminate the slumping or collapse of a battery electrode, e.g., the zinc electrode, and to give it physical integrity, a novel support means has been developed for electrode materials. Thus, it has been found that the use of potassium titanate or other inorganic materials in the form of fibers, mats, paper or cloth as supports for the electrode, increases cycle life, insures the physical integrity of the electrode and improves its efficiency at temperatures of the order of 100° C. as well as at ambient temperatures.

The invention will be described below in connection with the accompanying drawing wherein:

FIG. 1 illustrates one embodiment of a supported electrode employing the invention principles;

FIG. 2 illustrates another embodiment of the invention;

FIG. 3 shows still another embodiment of an electrode according to the invention.

FIG. 4 illustrates a still further modification of the supported electrode principles of the invention;

FIG. 5 shows a battery assembled with the supported electrodes of the invention; and FIGS. 6 and 7 are plots showing the discharge and charge cycle voltage conditions for the first and a latter cycle of operation for certain supported electrodes according to the invention.

According to one embodiment of the instant improvements, the inorganic material in the form of fibers, e.g., of potassium titanate, can be incorporated in the metal-containing materials which are mixed to form the electrode, e.g., a zinc electrode, and the resulting electrode matrix including the inorganic fibers dispersed therein can be used as the electrode for assembly in a battery. Such an electrode having the inorganic fibers substantially uniformly distributed or incorporated therein is illustrated in FIG. 1 of the drawing. In FIG. 1, numeral 10 represents the electrode formed of a matrix of the electrode material 12, e.g., a mixture of zinc and zinc oxide, having homogeneously distributed therein the inorganic fibers 14. Numeral 16 represents an electrode screen which is pressed against one side of the electrode and 18 is the terminal wire connected to the screen.

Instead of incorporating the inorganic fibers into the electrode material, as above noted, the inorganic fibrous material, e.g., in the form of mats or paper, can be employed as a supporting matrix impregnated with the electrode material.

Thus, according to the modification illustrated in FIG. 2, the supported electrode 20 can be formed by placing a sheet of fibrous inorganic material 22, e.g., potassium titanate fiber paper, over the electrode 24, e.g., zinc electrode, after it has been prepared, e.g., after the zinc-zinc oxide mix has been prepared, and the assembly of electrode and inorganic fiber paper pressed together. Pressing these materials together impregnates the organic fiber paper with active electrode material and results in an electrode of good strength which does not slump, segregate or deteriorate during cycle testing at 100° C. Numeral 26 represents an electrode screen, e.g., a nickel screen, attached to the oppoiste face of the electrode, and 28 represents a terminal wire connected to such screen. The term "sheet" as applied to the fibrous inorganic material is intended to denote such fibrous material in the form of a mat, paper, cloth, and the like.

If desired, for example in the case of either a sintered or paste electrode, the fibrous support material in the form of fibers, mat, or paper, can be placed in surface to surface contact with the electrode substantially without any impregnation of the electrode material into the fibrous material.

In the embodiment shown in FIG. 3 a sandwich type electrode design 30 is provided by forming layers of electrode material 32 and fibrous paper 33, e.g., potassium titanate paper, the papers 33 being pressed into each layer of electrode material 32, forcing the active electrode material, e.g., zinc and zinc oxide, into the pores of the fibrous paper, or alternatively by placing the fibrous material 22 between the layers of electrode material 32 substantially without compression. Numeral 35 represents the electrode screen at the back of the electrode and 37 is the terminal wire.

In the electrode modification 39 of FIG. 4, an inorganic fiber mat or porous ceramic 41 is impregnated with a solution of a soluble silver or zinc material, e.g., silver nitrate or zinc nitrate, and the metal precipitated in the pores of the matrix, as indicated at 43. The electrode is then electrolytically formed. Numerals 45 and 47 represent respectively the electrode screen attached to one side of the electrode 39, and the terminal wire connected to the screen. Due to the use of the inorganic fibrous material, e.g., potassium titanate, in combination with the electrode, such an arrangement is strong and has superior high temperature resistance.

The preferred supported electrode arrangements are those illustrated in FIGS. 2 and 3, wherein the inorganic fibrous materials 22 and 33 are impregnated with the electrode material, or wherein such fibrous materials are placed in surface to surface contact with the electrode material.

Each of the types of supported electrodes illustrated in FIGS. 1 to 4 and described above can be incorporated into the battery assembly shown in FIG. 5.

Thus, for example, electrodes of the type indicated at 20 in FIG. 2 can be assembled to form a battery as shown in FIG. 5, employing a plastic case 34 formed of two symmetrical, e.g., Teflon, half portions 36 and 38 which are bolted together as indicated at 40. Compartments 36 and 38 of the case have recesses 42 formed therein to receive zinc and silver electrodes 20a and 20b, respectively, each corresponding to the electrode structure 20 of FIG. 2. The assembly of zinc electrode 26a and inorganic fibrous material, e.g., potassium titanate paper 22a, are placed in the electrode compartment 36 and against the metal screen 53. A silver oxide paste is placed in the opposite electrode compartment 38 to form electrode 26b and a sheet of inorganic fiber paper 22b, e.g., potassium titanate paper, is pressed therein so as to impregnate such inorganic fiber paper with the active electrode material, and the electrode 20b is also pressed into contact with the screen 55. A separator 48, which can be either an organic separator, or an inorganic separator as described in the above noted copending applications Ser. No. 379,093 and Ser. No. 378,858, preferably an inorganic separator as described in said applications, is disposed centrally between the case portions 36 and 38 so that the electrodes 20a and 20b are pressed against opposite surfaces of such separator, with the inorganic fiber papers 22a and 22b positioned between the separator 48 and the electrode materials 26a and 26b.

Teflon spacers 50 and 52 are provided about the periphery of separator 48, to form a leak proof seal. Terminal wires 54 and 56 are connected respectively to the screens 53 and 55, and are brought through the plastic electrode sections at the top of the assembly as shown. Small electrolyte reservoirs 58 and 59 are provided in the upper portion of the respective electrode compartments 36 and 38.

It will be understood that if desired, only one of the electrodes in the embodiment of FIG. 5, e.g., the zinc electrode 26a, can be supported as by the potassium titanate paper 22a, and the silver electrode 26b can be unsupported, thereby omitting the potassium titanate paper 22b.

The electrode types 10, 30 and 39 in FIGS. 1, 3 and 4, respectively, can be assembled in a similar manner to form a battery assembly as shown in FIG. 5 and discussed above.

In place of the titanate, particularly potassium titanate, fibers, mats, paper or cloth employed as the preferred inorganic electrode support material, other inorganic fibrous support material can be employed, in the form of fibers, mats or papers. Such inorganic fibrous material should have chemical resistance and heat stability. In preferred practice such materials should be resistant to caustic solutions at ambient temperatures and particularly at high temperatures of the order of about 150° C., in order to obtain extended cycle life at both ambient and elevated temperatures. These inorganic fibrous electrode support materials should also have sufficient porosity so that particularly when employed as papers or mats in contact with the electrode as in the arrangements of FIGS. 2 and 3, such fibrous materials will retain electrolyte and permit passage of electrolyte ions therethrough. Examples of suitable fibrous inorganic electrode support materials according to the invention include, in addition to titanates, e.g., potassium titanate, aluminosilicates, including alkali metal and alkaline earth metal aluminosilicates, e.g., sodium, potassium, calcium, barium, strontium and magnesium aluminosilicates, silica, zirconia, and alumina.

When preparing electrodes of the type illustrated in FIG. 1, e.g., zinc electrodes supported by the above noted inorganic fibers such as potassium titanate fibers, the fibers are mixed with the electrode composition such as a slurry or paste, e.g., of a zinc and zinc oxide mixture, employing from about 2% to about 50%, preferably about 3% to about 20%, and most desirably from about 5% to about 10%, by weight of the inorganic fibrous material, e.g., potassium titanate, based on the total weight of the electrode composition. The use of an excess of the inorganic fibrous material increases the battery resistance, and employment of an insufficient amount of the inorganic fibrous material, e.g., potassium titanate, does not provide a properly supported electrode structure. The inorganic support fibers, e.g., potassium titanate, can have a particle size, e.g., of the order of about 5 microns. However, the particle size of such fibers can be varied. The metal e.g., zinc, particles employed in the slurry in which the fibrous inorganic materials are incorporated may have an order of subdivision in the case of the metal oxides, e.g., zinc oxides, of a fineness through 325 mesh, and, in the case of metals such as zinc, through 150 mesh.

In forming an electrode slurry such as for the production of a zinc electrode, a mixture of zinc oxide, or zinc and zinc oxide, together with mercury oxide and polyvinyl alcohol (PVA) can be employed, e.g., a mixture containing in relative proportions one part of zinc oxide, 0.08 part mercury oxide (HgO) and 0.02 part polyvinyl alcohol. Inorganic fibrous material, e.g., potassium titanate fibers, is incorporated in the electrode mixture in an amount of the order of about 5% by weight of the electrode mixture. When the electrode is formed, it can be electrolyzed, e.g., prior to, or following incorporation into a battery as illustrated in FIG. 5, to reduce the zinc oxide to zinc and form the battery cathode.

Mercury oxide is employed in the electrode mixes such as the above zinc electrode mix, to prevent the cell from showing overvoltage. In the absence of mercury oxide in such electrode mixes, the voltage will continue to rise as the battery is charged and such overvoltage causes a waste of power and generates hydrogen ions which is undesirable particularly in sealed batteries.

In forming the silver electrode, a mixture of silver and silver oxide, or silver oxide alone, is slurried, and potassium titanate fibers, for example, are incorporated, employing an amount thereof in the ranges noted above, most desirably about 5% to about 10% by weight of the electrode composition, and the resulting matrix placed in contact with a screen such as a nickel screen. When the electrode is formed it can be electrolyzed, e.g., prior to, or following incorporation into the battery illustrated in FIG. 5, to oxidize any silver present to silver oxide and form the battery anode.

The electrode assemblies incorporating an inorganic supporting material such as potassium titanate, in the form of fibers, mat or paper, as described above, and preferably employed in combination with inorganic separators in the form of insoluble hydrous metal oxides, e.g., hydrous zirconium oxide, of the types described in the above copending application Ser. No. 379,093, of Carl Berger et al., or in the form of the sintered ceramics, e.g., aluminosilicates, of the types described in the above copending application Ser. No. 378,858, of Carl Berger et al.

The insoluble hydrous metal oxides of which such inorganic separators are composed can include, for example, the hydrous oxides of zirconium, titanium, antimony, tungsten, silicon, scandium, bismuth, vanadium, aluminum and cerium. A preferred insoluble hydrous metal oxide used in forming an inorganic separator is hydrous zirconium oxide. Such hydrous metal oxide separators can be prepared by various techniques, as described in the above copending application Ser. No. 379,093.

Other porous inorganic materials which can be employed as separators include the sintered aluminosilicates, including the alkali metal and alkaline earth metal aluminosilicates, e.g., the sodium, potassium, magnesium, calcium, barium and strontium aluminosilicates, sintered alumina or sintered silica, as described in Ser. No. 378,858.

Organic separators which can be employed to produce batteries incorporating the supported electrode principles hereof include microporous plastics such as nylon, Dynel, Teflon, sausage casing (felted regenerated cellulose), and the like.

As previously noted, the separator functions to retain electrolyte to separate the electrodes, and also to permit transfer of electrolyte ions but prevent transfer of electrode ions.

The following are examples of practice of the invention:

Example 1

A silver electrode is prepared by pressing silver and silver oxide, or silver oxide alone, into contact with a nickel electrode screen, or pressing and sintering such silver-silver oxide mix at 250–600° C. and tack welding the electrode to the screen. The electrode is oxidized at 5–10 ma./cm.$^2$ until fully charged and can be overcharged 25% to 100%. Such electrode is then covered with a sheet of potassium titanate paper.

A zinc electrode is prepared by pressing a mixture of zinc and 9% by weight mercury oxide (HgO) onto an electrode screen, or by mixing zinc, zinc oxide and 0.5% to 1.5% polyvinyl alcohol as a slurry with 30% KOH and reducing the zinc electrode by electrolyzing at 10–100 ma./cm.$^2$. A small additional amount of zinc oxide is sifted onto the surface of the electrolyzed electrode and it is then covered with a sheet of potassium titanate paper. The battery is then assembled employing 25% to 45% KOH as the electrolyte and an inorganic separator formed of a sintered ceramic aluminosilicate.

Batteries made up from the above noted improved electrode assemblies employing zinc and silver electrodes in combination with potassium titanate in the form of fibers or paper, and ceramic separators, e.g., flame-sprayed or sintered ceramic separators, ran in excess of 1,600 discharge-charge cycles of 30 minutes charge-30 minutes discharge at 10 to 30 ma./cm.$^2$ and 10% to 60% depth of discharge, at 100° C. Similar batteries identical but not using any inorganic supporting materials such as potassium titanate fibers or paper in conjunction with the electrodes, failed after 15–100 charge-discharge cycles.

Example 2

The procedure of Example 1 is repeated except that in place of an inorganic separator, a porous Teflon separator is employed, and testing is carried out at ambient temperatures. Results similar to those of Example 1 are obtainable.

Example 3

The procedure of Example 1 above is followed except that in place of the sintered ceramic separator, a hydrous zirconium oxide separator of the type formed by impregnating a flame-sprayed zirconia with a gel of an inorganic hydrous zirconium oxide, is employed. Results similar to those of Example 1 are obtained.

Example 4

A slurry containing 94% of a mixture of zinc and zinc oxide, about 1.0% by weight polyvinyl alcohol, and 5% of fibers of potassium titanate is formed, and the resulting mixture pressed and employed as an integrally supported zinc electrode.

A mixture of silver and silver oxide powder, and about 5% to 10% potassium titanate fibers is formed into a matrix. The resulting matrix is placed in contact with a screen, and this unit employed as an integrally supported silver electrode.

These electrodes when employed in a high energy density battery system as illustrated in FIG. 5, employing an inorganic separator such as a flame-sprayed zirconia, perform satisfactorily at 100° C. for a number of cycles of the order of 1,600 discharge-charge cycles each of 30 minutes duration.

Example 5

Electrodes are prepared according to the modification shown in FIG. 2 by placing a sheet of potassium titanate fiber paper over a zinc electrode after it had been prepared as described in Example 1, and pressing the assembly of electrode and inorganic fiber paper into the electrode compartment. Pressing these materials in place in the electrode compartment impregnates the inorganic fiber paper with active electrode material and results in an electrode which does not slump or segregate during cycle testing at 100° C.

A silver electrode is prepared by pressing 3 grams of a silver oxide-potassium hydroxide paste into an electrode compartment, placing a sheet of potassium titanate fiber paper on top of the paste and pressing it so as to impregnate the inorganic fiber paper with active electrode material.

The silver electrode is then formed in 30% KOH at 5 ma./cm.$^2$ to its nominal capacity of 0.9 ampere-hour plus a 50% overcharge at the same current density.

The above two electrodes are placed in a cell of the type shown in FIG. 5, using a sintered ceramic aluminosilicate separator about 0.020 inch thick.

This battery assembly is tested, and cycled at one-half hour discharge, one-half hour charge per cycle, at 100° C. The battery ran for 1,457 such cycles at 100° C. The charge and discharge currents are 20 ma./cm.² with a 30% depth of discharge.

FIG. 6 of the drawings shows the discharge and charge voltage for the first and 1,456th test cycles for this battery. It is seen from FIG. 6 that the discharge voltage for the 1,456th cycle was almost constant at about 1.4 volts throughout the 30 minute discharge cycle, only modestly below the approximately 1.45 volts during the first discharge cycle.

Example 6

Zinc and silver electrode assemblies are prepared as in Example 5 and assembled in a battery as illustrated in FIG. 5, but employing in place of the sintered ceramic separator of Example 5, a flame-sprayed zirconia separator. This cell when tested completed 1,700 one-half hour discharge, one-half hour charges cycles at 100° C., 20 ma./cm.² charge and discharge, with 25% depth of discharge.

FIG. 7 of the drawing shows the discharge and charge curves for the first and 1,650th test cycle. It is seen from FIG. 7 that the discharge voltage for the 1,650th cycle varies from about 1.6 to about 1.4 volts along a declining straight line during such 30 minute discharge cycle, whereas, during the first discharge cycle, the discharge voltage was substantially constant between about 1.42 and about 1.4 volts during the entire 30 minute discharge cycle.

Example 7

Zinc and silver electrode materials are prepared as in Example 5, and "sandwich"-type electrodes as illustrated in FIG. 3 are formed, employing two layers of electrode material and two sheets of potassium titanate paper, one between adjacent layers of electrode material as illustrated in FIG. 3. Such "sandwich"-type zinc and silver electrodes are assembled in a battery as illustrated in FIG. 5, employing a flame-sprayed zirconia separator. Such a battery is capable of running from 2,000 to 4,000 one-half hour discharge, one-half hour charge cycles at 100° C.

Examples 5 to 7 and FIGS. 6 and 7 show the improved longevity of a battery employing the invention principles, and demonstrate the significant increase in cycle life resulting from supporting the electrodes, particularly the zinc electrode, with an inorganic supporting material such as potassium titanate, in the form of fibers, mat or paper. Such inorganic supporting material holds the active electrode material in place preventing slumping and detachment from the electrode screen as well as strengthening the electrode structurally.

Example 8

The procedure of Example 4 is repeated employing in place of the fibers of potassium titanate in both the zinc and silver electrode materials, the same amounts of fibers of the following respective inorganic materials:

(a) Aluminosilicate
(b) Silica
(c) Zirconia
(d) Alumina

The zinc and silver electrodes formed by incorporating the respective aluminosilicate, silica, zirconia and alumina fibers, are assembled in a battery system as illustrated in FIG. 5, employing a flame-sprayed zirconia separator and KOH as electrolyte. Operating results similar to those of Example 4 can be obtained.

Example 9

The procedure of Example 1 is repeated employing in place of the fibrous sheets of potassium titanate paper employed therein in contact with the zinc and silver electrodes, fibrous sheets of the following respective inorganic materials:

(a) Aluminosilicate
(b) Silica
(c) Zirconia
(d) Alumina

The respective batteries so assembled provide results in operation similar to those of Example 1.

Although the invention has described principally in terms of supporting the electrodes of a zinc-silver battery, it will be understood that the invention principles can be applied to supporting any battery electrode, particularly when the electrode material tends to slump or disintegrate, e.g., as in the case of a zinc electrode. Thus, for example, inorganic supporting material such as potassium titanate, in the form of fibers, paper or mat, can be employed as herein described to support the silver and cadmium electrodes of a high energy density silver-cadmium battery, or the nickel and cadmium electrodes of a high energy density nickel-cadmium battery.

During discharge of the batteries described above and illustrated in the drawing, as is well known, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium" and the term "metal," referring to the metals forming the respective electrodes of such battery systems, are intended to denote either the respective metals themselves or the corresponding oxides thereof.

We are aware of U.S. Patents 1,139,213 and 2,669,594. In the former, there is described a combined zinc-titanium negative electrode formed by precipitating these metals from a solution of soluble salts of zinc and of titanium. In the zinc-titanium electrode of this patent the titanium functions not as a support for the zinc electrode but rather as a part of the metal network including the zinc and which apparently is intended to improve the electrical conductivity of the zinc electrode. In the instant invention, the inorganic, e.g., potassium titanate material in fibrous form functions to improve the strength of, and to support the electrode, and has substantially no electrical conductivity. Further, the titanium of the zinc-titanium electrode of the patent is in reduced essentially elemental or metallic form, in contrast to the potassium titanate fibrous material employed in combination with the electrode according to the invention.

In U.S. Patent 2,669,594 there is described a battery in which a fibrous or porous material such as cellulosic paper is placed in direct contact with the powdered zinc or zinc oxide electrode, the zinc and/or zinc oxide being wrapped or otherwise contained in such paper. However, in this arrangement, if the battery is operated at elevated temperature, e.g., of the order of 100° C. or more, the cellulosic paper of the patent will be destroyed by the hot caustic electrolyte. On the other hand, by employing the fibrous inorganic materials, e.g., potassium titanate, in the electrode supporting arrangements of the invention, such materials are not only highly efficient with respect to possessing proper pore size and the ability to maintain an electrode, e.g., a zinc electrode, from deteriorating at normal temperature, but have the additional important advantage of permitting operation of the battery at elevated temperatures of 100° C. and higher, without danger of deterioration of the fibrous support materials, and thus providing a battery of much longer cycle life both at ambient and at highly elevated temperatures.

While we have described particular embodiments of our invention for purposes of illustration, it will be understood that the invention is not to be taken as limited except by the scope of the appended claims.

We claim:

1. A battery comprising a pair of electrodes of opposite polarity and a porous separator between said electrodes for retaining electrolyte and permitting transfer of electrolyte ions, at least one of said electrodes comprises and electrode matrix having substantially uniformly distributed therein, fibers of an inorganic material selected from the group consisting of titanates, aluminosilicates, zirconia and alumina, in an amount of about 2% to about 50% of said fibers by weight of the electrode composition.

2. A battery including electrode structure comprising a metal electrode matrix having substantially uniformly distributed therein potassium titanate fibers in an amount of about 2% to about 50% by weight of the electrode composition.

3. A battery comprising a pair of electrodes of opposite polarity and a porous separator between said electrodes for retaining electrolyte and permitting transfer of electrolyte ions, and an inorganic fibrous material selected from the group consisting of titanates, aluminosilicates, zirconia and alumina, combined in supporting relation with at least one of said electrodes and positioned between said separator and at least one of said electrodes.

4. A battery which comprises zinc and silver electrodes and a porous separator between said electrodes for retaining electrolyte and permitting transfer of electrolyte ions, at least one of said electrodes consists essentially of a metal matrix and uniformly distributed therein potassium titanate fibers in an amount of about 2% to about 50% by weight of the electrode composition.

5. A battery comprising a pair of electrodes of opposite polarity and a porous separator between said electrodes for retaining electrolyte and permitting transfer of electrolyte ions, and a sheet of an inorganic fibrous material selected from the group consisting of titanates, aluminosilicates, zirconia and alumina, in supporting relation in contact with a surface of at least one of said electrodes and positioned between said separator and at least one of said electrodes.

6. A battery which comprises zinc and silver electrodes and a porous separator between said electrodes for retaining electrolytes and permitting transfer of electrolyte ions, and a sheet of an inorganic fibrous material selected from the group consisting of titanates, aluminosilicates, zirconia and alumina in supporting relation in contact with a surface of at least one of said electrodes and positioned between said separator and at least one of said electrodes.

7. A battery which comprises zinc and silver electrodes and a porous separator between said electrodes for retaining electrolyte and permitting transfer of electrolyte ions, and a sheet of fibrous potassium titanate in supporting relation in contact with a surface of said zinc electrode and positioned between said separator and said zinc electrode.

8. A battery which comprises zinc and silver electrodes and a porous separator between said electrodes for retaining electrolyte and permitting transfer of electrolyte ions, and a sheet of fibrous potassium titanate in supporting relation in contact with a surface of said zinc electrode and positioned between said separator and said zinc electrode, and a sheet of fibrous potassium titanate in supporting relation in contact with a surface of said silver electrode and positioned between said separator and said silver electrode.

9. A battery which comprises zinc and silver electrodes and a porous separator between said electrodes for retaining electrolyte and permitting transfer of electrolyte ions, and a sheet of fibrous potassium titanate in supporting relation in contact with a surface of said zinc electrode and positioned between said separator and said zinc electrode, said sheet of fibrous material being impregnated with the active zinc electrode material, a sheet of fibrous potassium titanate in supporting relation in contact with a surface of said silver electrode and positioned between said separator and said silver electrode, said last mentioned sheet of fibrous material being impregnated with the active silver electrode material.

References Cited
UNITED STATES PATENTS

| | | | |
|---|---|---|---|
| 2,669,594 | 2/1954 | Andre | 136—31 X |
| 2,833,620 | 5/1958 | Gier et al. | 23—51 |
| 2,484,787 | 10/1949 | Grant | 136—145 |
| 2,511,887 | 6/1950 | Vinal | 136—145 |
| 2,531,504 | 11/1950 | Dillehay et al. | 136—145 |
| 2,653,985 | 9/1953 | Philipps | 136—145 |
| 3,043,898 | 7/1962 | Miller et al. | 136—86 |

WINSTON A. DOUGLAS, *Primary Examiner.*

A. SKAPARS, *Assistant Examiner.*